Dec. 21, 1926.

H. L. DE ZENG

EYE TESTING INSTRUMENT

Filed Nov. 12, 1921    4 Sheets-Sheet 2

INVENTOR
Henry L. De Zeng.
BY
Riedesheim Fairbanks
ATTORNEYS

Dec. 21, 1926.          1,611,167
H. L. DE ZENG
EYE TESTING INSTRUMENT
Filed Nov. 12, 1921     4 Sheets-Sheet 3

INVENTOR
Henry L. de Zeng.
BY
ATTORNEYS

Patented Dec. 21, 1926.

1,611,167

UNITED STATES PATENT OFFICE.

HENRY L. DE ZENG, OF MOORESTOWN, NEW JERSEY, ASSIGNOR TO DE ZENG STANDARD COMPANY, OF CAMDEN, NEW JERSEY, A CORPORATION OF NEW JERSEY.

EYE-TESTING INSTRUMENT.

Application filed November 12, 1921. Serial No. 514,467.

This invention relates to a new ophthalmologic instrument used in measuring the refraction of the eye and in testing its motor muscles.

The principal object of the invention is to provide in highly condensed form an instrument by the use of which the eye may be measured for glasses designed to correct any existing errors in the refracting media of the eye or imbalances in its motor muscles.

A further object of the invention is to provide a binocular instrument having every facility for testing the eyes separately and finally together, wherein the cylindrical lenses used in the correction of astigmatism are confined to carriers of limited dimensions for the avoidance of conflict with the nose of the person under examination when setting the cylinder lenses to any required axis.

Another object of the invention consists in providing cylindrical lens attachments in binocular form and of such design as to avoid conflict between the battery of the cylinder lenses on one side and that on the other side when setting the lenses at any desired axis before either eye and especially when the instrument is adjusted to meet the narrower interpupilary requirements of certain patients including children.

Another object of the invention is to provide an instrument with as few lens carriers as possible without unduly limiting the range of focal powers of either the spherical or cylindrical lenses.

Another object of my invention is to provide an instrument wherein the displacing prisms of fixed values are carried by means independent of the mobile or rotary prism units and which when in position at the sight opening occupy a predetermined position of base, thus expediting the examination and furnishing exact means for displacing the image in muscle tests.

Another object of the invention is to provide an instrument wherein the protecting shields of the lenses are utilized as lens carriers also for the purpose of condensing the lens carrying features to the greatest possible extent thereby producing an instrument as thin as can be made while containing the necessary refraction and muscle testing elements.

A further object of my invention is to provide an instrument wherein the tests of the eye may be made while employing light in different colors through the utilization of light filters in combination with other testing elements of the instrument.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Similar numerals of reference indicate corresponding parts.

Referring to the drawings.

In my copending application Serial No. 457,782, upon which Patent No. 1,483,786 issued on February 12, 1924, for an ophthalmological instrument, I have described and broadly claimed a novel eye testing instrument which can be employed for the same purpose as my present invention. In my present invention, however, certain of the units which make up the instrument have a different arrangement and collocation particularly the lens carrying disks and covers thereof, whereby certain supplementary lenses are mounted within the dust covers by which arrangement a more compact instrument is provided, whereby the instrument is simplified in construction, more exact in its application, and more easily manipulated. In addition, I am enabled to increase the range of the instrument.

Figure 12:
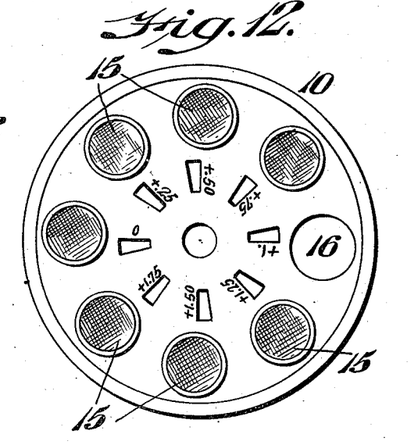
Figure 12 represents a front elevation of a first lens carrier of the spherical lens attachment.
Figure 13:
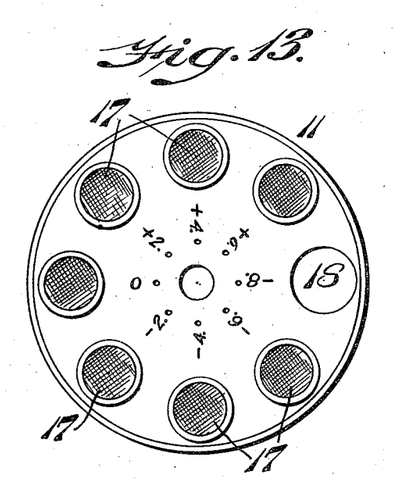
Figure 13 represents a front elevation of the second or rear lens carrier of the spherical lens attachment.
Figure 14:
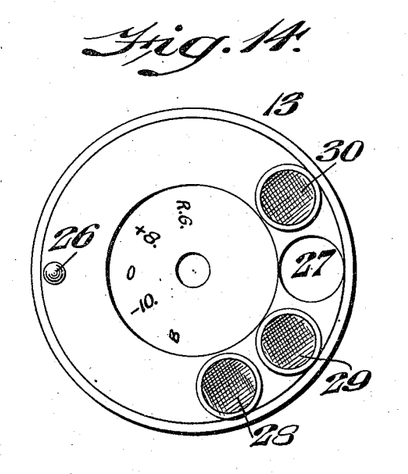
Figure 14 represents a rear elevation of a shield or cover for the spherical lens attachment.

1 designates a socket supporting arm for attaching the instrument to a fixture. The arm 1 is pivotally connected to a central supporting block 2 which carries the adjustable interpupilary slides 3. These slides 3 are each provided with laterally projecting arms 4, which, in turn, carry the testing units comprising the spherical lens units 5, the cylindrical lens units 6, the double rotary prism units 7 and the Maddox multiple rod units 8, all of which will be described in detail hereafter. The spherical lens units 5 are supported by a bracket 9 rising from the rear end of the rearwardly projecting supports 4. The lens units 5 include two dial plates 10 and 11, see more particularly Figures 12 and 13, and also two auxiliary combined shield and lens carriers 12 and 13, respectively, see more particularly Figures 11 and 14.

Figure 10:
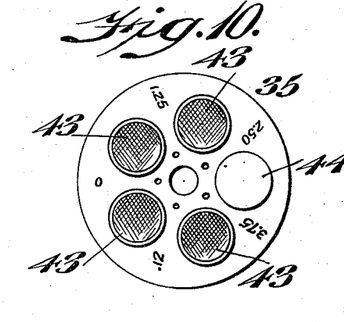
Figure 10 represents a front elevation of the second or rear lens carrier of the same unit as that of Figure 9.
Figure 11:
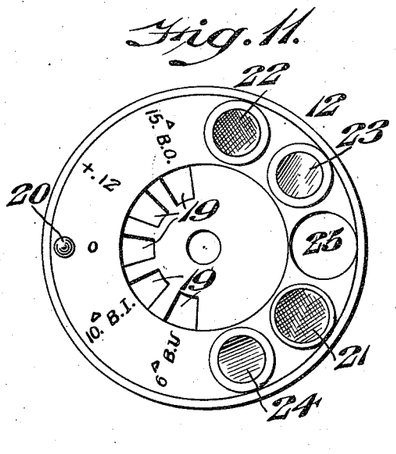
Figure 11 represents a front elevation of a front shield of the spherical lens attachment.

The parts 10, 11, 12 and 13 are pivotally supported at 14 on a bracket 9. Mounted in the front dial plate 10 are seven spherical lenses 15, and the dial plate is provided with a sight opening 16. These spherical lenses 15 range preferably from 0.25 to 1.75 diopters, inclusive, in steps of quarter diopters in the positive denomination. Mounted in the rear dial plate 11 are seven spherical lenses 17 and this rear dial plate also has a sight opening which is designated 18. Some of these spherical lenses 17 are of minus power and some are of plus power, the plus powers being preferably 2.00, 4.00 and 6.00 diopters and the minus powers being preferably 2.00, 4.00, 6.00 and 8.00 diopters. The powers of the lenses referred to are marked on the front faces of the dials carrying these lenses, as indicated in Figures 10 and 11. In each instance, the number indicates preferably the lens opposite to it on the other side of the dial.

The front cover plate 12 has a plurality of openings 19, see Figure 11, through which the focal numbers of the lenses carried by the dials underneath are visible as said lenses are brought into operative position at the sight opening. The front cover plate 12 is provided with a handle 20 for rotating it. The cover plate 12 carries auxiliary lenses preferably as follows:—a+0.12 diopters spherical lens 21, a six diopter displacing prism 22, a ten diopter displacing prism 23 and a fifteen diopter prism 24. It is also provided with a sight opening 25. It also has index numbers indicated on its face, indicative of the lens diametrically opposite. The rear shield and lens carrier 13 is provided with a handle 26 and with a sight opening 27, and carries a plurality of auxiliary lenses including preferably a color filter 28 which is preferably red, a plus 8.00 diopter spherical lens 29 and a minus 10. diopter spherical lens 30. The lens carriers or dial plates 10 and 11 are preferably peripherally knurled in order to facilitate their rotation by the fingers of the operator.

Figures 2, 3, 4, 5:
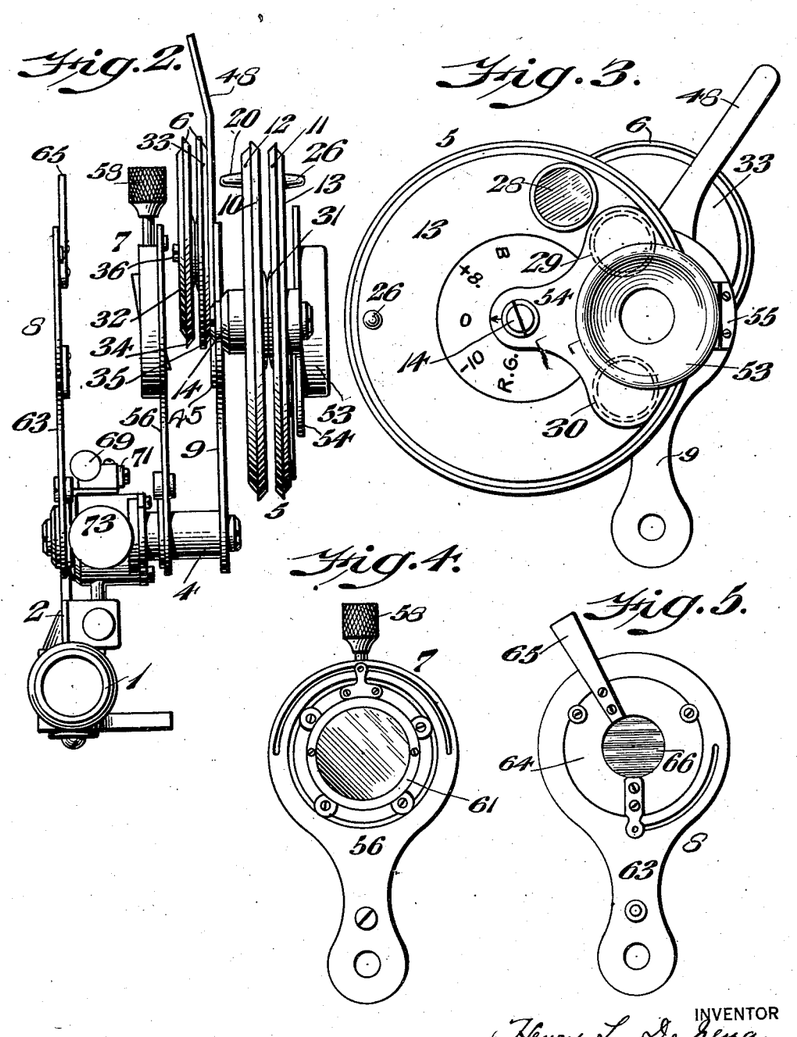
Figure 2 represents an end elevation of my instrument.
Figure 3 represents, in rear elevation, a portion of the instrument.
Figure 4 represents a rear elevation of the double rotary prism unit employed.
Figure 5 represents a rear elevation of a Maddox multiple rod unit employed.

The number of spherical lenses and their powers may be varied in accordance with conditions and requirements met with in practice for increasing or decreasing the range of powers obtainable in the instrument. To insure correct positioning of the lenses at the sight opening, a multiple bearing spring clip 31 is provided for each dial, see more particularly Figures 2 and 6. Rotative pressure on the dial wheel will release the spring clip so that the dial wheel may be advanced as desired. The construction and arrangement of the multiple bearing spring clips is the same as that disclosed in my Patent No. 1,483,786 aforesaid and a detailed description is therefore believed to be unnecessary.

Each cylindrical unit 6 is supported by its respective bracket 9. This unit is made up of front and back cover plates 32 and 33, respectively, see more particularly Figures 7 and 8, and front and back lens dials or carriers 34 and 35, respectively, see more particularly Figures 9 and 10, which are pivotally supported in the cover plates at 36.

Figure 7:
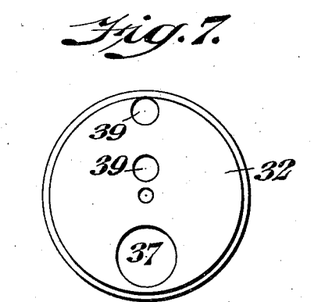
Figure 7 represents, in elevation and in detached position, a front shield of one of the cylindrical lens testing units.
Figure 8:
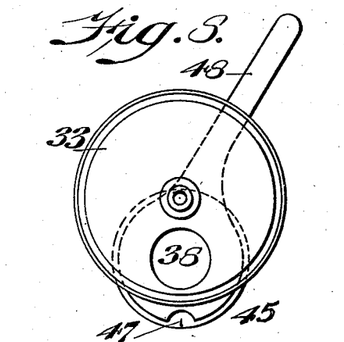
Figure 8 represents, in elevation, one of the rear shields, showing more particularly its attachment to one of the adjustable members of the cylinder lens system.

The front cover plate 32 is provided with a sight opening 37, and the rear cover plate is provided with a sight opening 38, see more particularly Figures 7 and 8. The front cover plate covers one or more openings 39 through which the focal power indicators of the cylinder lenses are visible when the same are in operative position at the sight opening.

Figure 9:
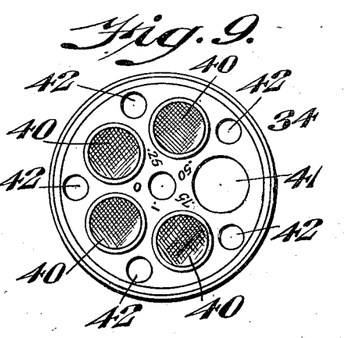
Figure 9 represents a front elevation of the the first lens carrier in a cylinder lens unit.

In the dial 34, see Figure 9, are preferably four cylindrical lenses 40, and a sight opening 41 is provided. These cylindrical lenses are preferably 0.25, 0.50, 0.75 and 1.00 diopters in negative power. The powers of these lenses are also indicated on the dial, see Figure 9, each index indicating the lens diametrically opposite to it. The dial 34 is provided with openings 42 through which the index readings on the dial 35 are visible when the same are in operative position at the sight opening. The rear dial 35, see Figure 10, is preferably provided with four cylindrical lenses 43 and with a sight opening 44. These lenses are preferably of focal powers of 0.12, 1.25, 2.50 and 3.75 diopters in negative power. Each index is indicative of the lens diametrically opposite to it.

In the invention here shown, all cylindrical lenses are of minus denomination but the invention may embody similar cylindrical lens attachment with all cylindrical lenses of the plus denomination or further-more any combination of plus and minus denomination required to meet conditions of operation may be incorporated.

While the cylindrical lenses contained in the invention as shown are of minus character and are mounted in their respective cells with their axes radial with the dials or lens carriers, they may be mounted in their cells with their axes in any desired position, in which latter case the index and scale readings may all be so arranged that each successive lens will come into operative position with its axis in a predetermined meridian. The peripheral edges of the cylindrical dials 34 and 35 are preferably knurled to facilitate their rotation.

The required cylindrical powers are obtained through employment of the lenses in the dial, singly or in combination, by exposing one or two lenses at the sight opening as required for obtaining the required cylindrical lens focal equivalent. It will be noticed that in my present invention I have confined the diameters of the cylindrical lens attachment to within certain limitations for the purpose of avoiding conflict with the nose of the patient and conflict between the two said attachments when used binocularly. It is therefore obvious that this construction is unique because of its compactness and adaptability to binocular eye testing instruments. It is also exceedingly simple in its construction and mode of operation. The cylindrical unit 6 is eccentrically positioned with respect to the main sight opening 37, the whole cylinder unit being rotatable about the center of said sight opening for the procurement of the required cylinder axes. On the bracket 9, contiguous with the rotatable disc 45 which carries the cylinder unit 6, is a degree scale 46 which acts in co-operation with the indicator 47 to indicate the axis of the cylinder when in operative position at the sight opening 37. The whole cylinder unit may be turned by the handle 48 for the procurement of the required cylinder lens axis. The cylinder units need only a rotation of 180° to obtain the various axes required in eye testing.

Figure 6:
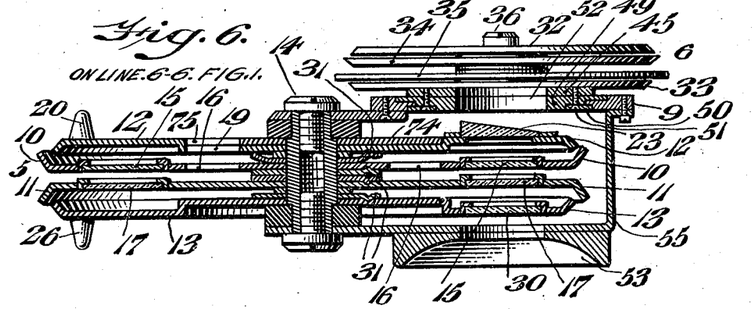
Figure 6 represents a section on line 6—6 of Figure 1.

The cylinder lens units are adjustably mounted on the bracket 9 for the adjustment required in obtaining the various cylindrical axes in the following manner, see more particularly Figure 6.

49 designates a disc rotatable in the bracket 9, the disc and bracket being recessed to receive a friction ring 50 through which passes fastening devices 51 which also pass through the disc 49 and are connected with the disc 45. This disc 45 has a central sight opening 52 which also extends through the disc 49. The friction ring 50 is preferably concaved so that the tension may be adjusted in accordance with the requirements in holding the cylinder units in any desired position. This ring is made preferably of spring metal, and, in the position shown in the drawing, is flat.

Figure 1:
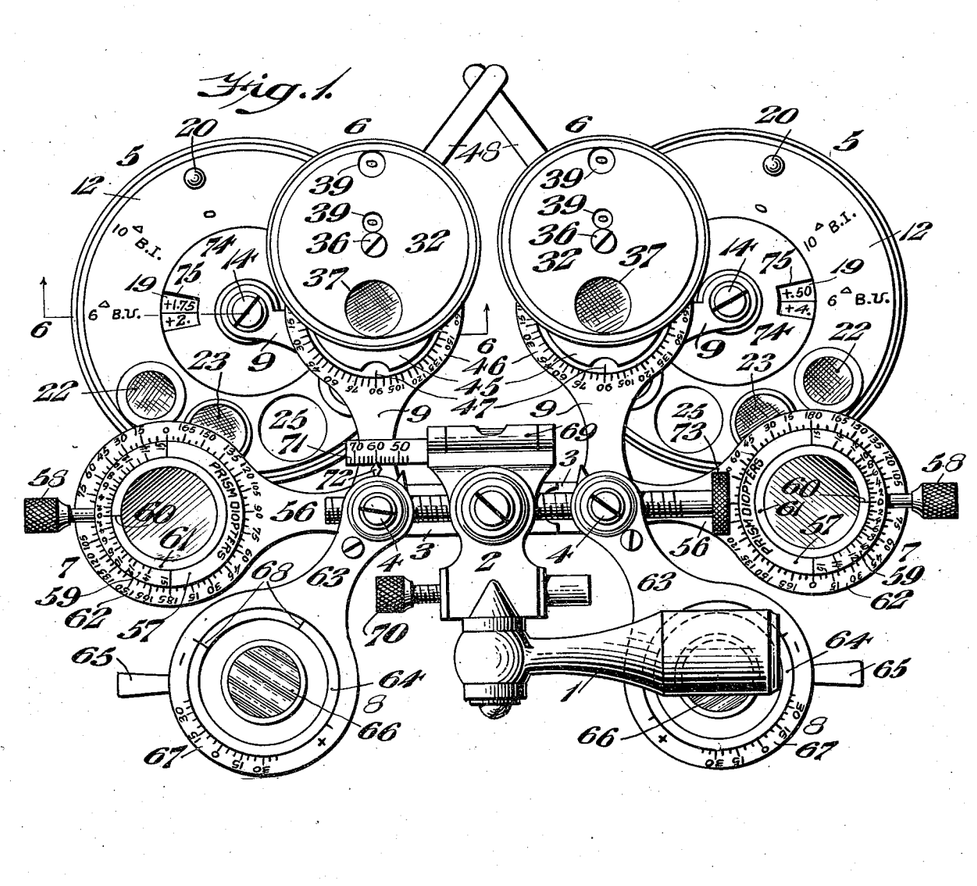
Figure 1 represents a front elevation of an eye testing instrument, embodying my invention.

53 designates eye cups carried by fixtures 54 which are mounted at 14 and 55 on the brackets 9. While in the present invention I have shown the eye cups 53 as being attached to the instrument, nevertheless they may be detachably mounted for sterilization purposes when so desired. Furthermore these eye cups may be adapted to receive covering material for sanitary purposes. The rotary prism units 7 are provided with a bracket 56 mounted at 4, see Figure 1. Rotatably mounted in the brackets 56 are double rotary prisms 57 whereby any desired prism equivalent, ranging from zero to fifteen prism diopters, may be obtained by turning the pinion 58, as indicated, upon the dioptrix prism scale 59 on the face of the prism case and the indicator 60 placed upon the prism cell 61. Surrounding the prism case is a degree scale 62, which, acting in co-operation with a line indicator on opposite sides of the prism case at the 15 diopter reading of the prism scale provides exact means for locating the base of the derived prism equivalent in any desired angular position before the eye. The mobile prism unit is of customary construction and contains two prisms of equal value, each carried in a separate cell, each having gear teeth about its outer periphery which engage a pinion located between them. The action of the pinion gives the prisms inverse rotation and consequent resultant prism equivalents, as indicated by the scale.

As my invention here shown is a binocular testing instrument, the testing units on either side are frequently required for use at the same time, and, in consequence, these units including the Maddox multiple rods and the double rotary prisms must be of such proportions as will admit of their positioning in line with the sight openings without interference, or, in other words, without the inner edges of the mountings of said units conflicting when the instrument is adjusted to meet the requirements of patients having small interpupilary measurements and particularly those patients and children having an interpupilary measurement of fifty-four mm. or less. In prior constructions of eye testing equipment of binocular character, these Maddox rods and rotary prism units have been considerably larger in diameter and in consequence said units could not be employed collectively for the testing of the eyes of patients having interpupilary measurements of comparatively narrow degree, and could not reach interpupilary measurements of fifty millimeters or less without the inner edges of the mounting striking and thereby preventing a proper alignment of the units with the line of observation.

The Maddox rod units 8 are provided with brackets 63 which are pivotally mounted at 4. Rotatable plates 64 are rotatably mounted in the brackets 63 and are provided with an actuating handle 65. The Maddox rod lens 66 is of white glass and is mounted in its rotatable plate 64. Partly surrounding the plate 64 is a degree scale 67 carried by the bracket 63, and which, in co-operation with indicators 68, provides means for determining an oblique positioning of the optical axes of Maddox rod lenses.

69 designates a level in fixed relationship with the slide supporting mechanism and adjusted by means of the screw 70. 71 designates an interpupilary scale which co-operates with a pointer 72.

The slides 3 are relatively adjusted by means of the screw 73. 74 designates stationary discs having openings 75 through which the focal index numbers of only those lenses which are in operative position can appear. To make an examination with this eye testing instrument, the distance between the sight opening is adjusted to conform with the interpupilary dimensions of the patient by means of the screw 73. In testing one eye the other is blanked by the rotation of the rear shield 13 (see Fig. 14) to cover the sight opening. The refraction of the eye is then tested through the use of the spherical and cylindrical lenses which are moved into place through the rotation of their respective dials. When the refraction of the first eye is tested one shield is rotated to uncover the sight opening, and the other shield is rotated to cover the sight opening so that the other eye can be tested in a similar manner. When both eyes have been tested the shields are rotated to leave both eyes unobstructed and in the field of examination.

With a small point of light as a test object located five or six meters distant from the instrument, a Maddox multiple rod unit 8 is placed in alignment on the side corresponding to the eye under test with its corrugations or axis vertical. The eye under test will then see a horizontal streak of light, while the other eye will see the original point of light. Should the streak cut the point of light a proper vertical co-ordination of the visual lines of the two eyes would be indicated. With the Maddox rod set with axis horizontal, the streak of light would then appear in a vertical plane, and should this streak cut the point a proper horizontal co-ordination of the visual axes of the two eyes would be indicated. Should the streak fail to cut the point when in either position, a lack of proper co-ordination would be indicated, and a test of the motor muscles of the eyes should then be made in the following manner: To test the lateral balance of the muscles of the right eye the displacing prism 22 with base up carried by the front shield 12 of the spherical lens attachment 5 should be placed in operative position at the main sight opening 37. This prism will displace the test object seen by the right eye downward beyond what is known as the fusion area, and should it lie other than in a vertical plane with the true test object as seen by the other eye, a lateral imbalance of the muscles of the right eye would be shown to exist.

Should the lower object appear to the right of the upper one, an inward turning of the right eye would be indicated, whereas if the lower object appears at the left an outward turning of the right eye would be indicated and in either instance a measurement of the degree of imbalance thus shown could be made by placing the double rotary prism unit 7 in operative position and then turning on prism power based out or in respectively in such degree as to cause the lower object to come into vertical alignment with the upper object, the imbalance being known as esophoria when the correcting prism base is out, or exophoria when the prism base is in.

When testing for imbalances of the vertical muscles a similar procedure is followed, excepting that in that instance the displacing prism 23 is employed with the prism base in and the double rotary prism unit 7 in this instance would be located with zero graduation horizontal and the prism power employed base up or down as may be necessary to cause the true image seen by the left eye and the false image seen by the right eye to come into horizontal alignment. This test is known as the monocular muscle test.

When testing the balance of the oblique muscles, the Maddox multiple rod units 8 are both placed in operative position with their axes vertical, and before the eye to be tested the displacing prism 22 should be positioned. This prism 22, being mounted to come into position with base up, the streak of light seen by the eye under examination will be depressed. The point of light used as a test object will be transformed by the Maddox rods, with their axes vertical, into two horizontal streaks of light and, as already stated, the streak seen by the right eye will appear to lie below the one seen by the left eye.

Should both streaks appear to lie in the horizontal plane, there would be no imbalance of the oblique muscles of the right eye, otherwise known as cyclophoria. However, should the lower streak dip at either end, cyclophoria would be manifested and its character and degree could be ascertained by a partial rotation in its mounting of the Maddox rod before the eye under test, the rotation being in an amount sufficient to straighten up the lower streak, the index 68 giving the readings accordingly.

Another test of the muscles known as the duction tests may also be carried out with my invention for the purpose of determining the individual motor muscle values, and while most of these tests are carried out by means of the double rotary prism units 7, that test known as the adduction test may require higher prism values than can be obtained from the fifteen diopter prism range of these units as preferably contained in my invention.

To meet this contingency, should it arise, I have provided the supplementary prisms 24 carried in the front shield 12 of the spherical lens attachment 5, which may be placed in operative position, with its base located out, thereby extending the range of the double rotary prism 7 to a maximum of thirty in this particular direction, the auxiliary prism being preferably of fifteen prism diopter value.

When making the monocular muscle tests, it is sometimes advantageous to present the false image in a different color from the true image for purposes of exact identification and to provide means for meeting these requirements, I have mounted preferably a red glass 28 in the rear shield 13 of the spherical lens attachment 5. This color screen may be thrown into or out of position by a partial rotation of the shield 13 by means of the handle 26. The spring stops 31 in this, as in all other operations of placing lenses in operative position at the sight opening, serve to insure proper optical alignment of the said lenses with the said sight opening.

In all these tests, the eye cups 53 serve to fix the eyes of the patient with respect to the sight opening and to support the patient's head, and maintain a proper relationship of the patient with respect to the instrument and the test object throughout the period of the examination, thereby meeting an important requirement in all eye testing instruments of similar character.

This construction is a departure from previous methods of guiding or supporting the eyes and head of the patient when being tested by similar apparatus.

It will be also noted from the description and the drawings that I present novel constructions in the combination shields and lens carriers 12 and 13, and that their employment enables me to reduce the number of complete lens carriers such as 10 and 11, to two only, whereas without utilizing a part of the peripheral portion of the said shields, other and additional lens carriers would have to be employed, thereby causing difficulty in manipulation and materially increasing the distance between the front lenses and the eye of the observer, which increase would bring about errors due to the separation of the working lenses from the eye.

Referring again to the supplementary prism 24, shown in Figure 11 as mounted in the front shield 12, this prism may be mounted eccentrically to the axis of the sight opening with which it is adapted to function or, in other words, certain advantages may be derived from so placing this prism in its mounting as to bring it into register at the sight opening other than centrally positioned with respect to the said sight opening. In mounting the prism eccentrically as explained, a prism of less diameter but with the same displacing power may be used, and, in consequence, the required separation of the various units in the instrument necessary for the passage of this prism as it is moved into and out of operative position may be minimized, the thickness of the prism at its base being considerably less with smaller diameter than with large.

In order to incorporate the required number of auxiliaries the spacings of the lens mounting in the shields 12 and 13 are different from the spacings of those in the main carriers or dials 10 and 11. By this arrangement, I am able to carry four auxiliaries in addition to a sight opening and at the same time obtain the required openings diametrically opposite for reading indicators and also obtain openings diametrically opposite through which may appear indicators pertaining to lenses carried in the main dials 10 and 11. I am, by this arrangement, further enabled to place indicators on the unoccupied section of the shields for indicating the values of the lenses carried therein, which unoccupied portion carrying said indicators also serves as a cover shield for the lenses in the main dials 10 and 11.

Referring again to the red color screens 28 carried by the rear shields 13 of the spherical lens attachments 5, these color screens may be advantageously employed in other colors not heretofore used in instruments of this character, notable among them being substances adapted to selectively retard certain portions of the visual spectrum. These substances may likewise be employed in the Maddox rod lenses 66, in the prisms constituting the double rotary prism 7, or in the substance of any or all of the lenses contained in the invention or otherwise incorporated into the construction in any desirable and practical manner, such light filters being of undoubted value in obtaining certain reactions of the vision and fusion centers frequently important in making complete and scientific eye examinations.

It will now be apparent that I have devised a novel and useful construction of an eye testing instrument which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. In an eye testing instrument, means for increasing the accuracy of prism readings comprising a support having a sight opening, a rotatable support having a prism lens fixedly mounted therein with the thickest part of the prism in a predetermined fixed position and out of line with the sight opening, means to align the prism with the sight opening by rotation of the rotatable member, a second support, a bracket pivotally mounted on the second support, a pair of rotary prisms on the bracket positioned out of line with the sight opening but adapted to align with the sight opening by movement of the bracket on its pivot, and means to rotate the rotary prisms to obtain the desired prism power.

2. In an eye testing instrument, means for increasing the accuracy of prism readings comprising a support having a sight opening, a rotatable support having a prism fixedly mounted therein out of line with the sight opening, means to align the prism with the sight opening by rotation of the rotatable support, a second support, a bracket pivotally mounted on the second support, a pair of rotary prisms on the bracket positioned out of line of the sight opening but adapted to align with the sight opening by movement of the bracket on its pivot, and means to turn the rotary prisms to obtain the desired prism power.

3. In an eye testing instrument, means for increasing the accuracy of prism readings comprising a support having a sight opening, a rotatable support having a prism fixedly mounted therein out of line with the sight opening, means to align the prism with the sight opening by rotation of the rotatable member, a second support, a bracket pivotally mounted on the second support, a pair of rotary prisms on the bracket positioned out of line with the sight opening but adapted to align with the sight opening by movement of the bracket on its pivot, means to turn the rotary prisms, and means to indicate the prism power.

4. In an eye testing instrument, means to increase the accuracy of prism readings comprising a member having a sight opening, means to support a prism fixedly in its mountings and out of line with the sight opening, means to move the fixedly mounted prism into line with the sight opening, means to support a pair of rotary prisms out of line with the sight opening, means to move the pair of rotary prisms into line with the sight opening, and means to rotate the rotary prisms to obtain the required prism power.

5. In an eye testing instrument, means to increase the accuracy of prism readings comprising a member having a sight opening, means to support a prism out of line with the sight opening and fixedly in its mounting, means to move the fixedly mounted prism into line with the sight opening, means to support a pair of rotary prisms out of line with the sight opening, means to move the pair of rotary prisms into line with the sight opening, means to rotate the rotary prisms, and means to indicate the prism power equivalent of the movement of the rotary prisms.

6. In an eye testing instrument, means for increasing the accuracy of prism readings comprising a member having a sight opening, a support having a prism fixedly mounted therein out of line with the sight opening and with the thickest part of the prism in a predetermined fixed position, means to move the fixedly mounted prism into line with the sight opening, means to support a pair of rotary prisms out of line with the sight opening, means to move the pair of rotary prisms into line with the sight opening, and means to rotate the rotary prisms to obtain the desired prism power.

7. In an eye testing instrument, means for testing muscular imbalance of the eye comprising a member having a sight opening, means for supporting a prism non-rotatable as respects its mounting and out of line with the sight opening, means for moving the prism into line with the sight opening, means for supporting a pair of rotary prisms out of line with the sight opening, means for moving the pair of rotary prisms into line with the sight opening and the fixedly mounted prism, means for rotating the rotary prisms to compensate the displacement of the fixed prism, and means to measure the prism power equivalent of the movement of the rotary prisms to ascertain the imbalance of the eye looking through the sight opening.

8. In an eye testing instrument, means for testing the muscular imbalance of the eye comprising a member having a sight opening, means for supporting a prism non-rotatably mounted as respects its mounting and out of line with the sight opening, rotatable means for moving the fixedly mounted prism into line with the sight opening, means for supporting a pair of rotary prisms out of line of the sight opening, pivotal means for moving the pair of rotary prisms into line with the sight opening, means for rotating the rotary prisms to compensate the displacement of the fixedly mounted prism, and means to measure the prism power equivalent of the movement of the rotary prisms to ascertain the imbalance of the eye looking through the sight opening.

9. In an eye testing instrument, means for testing the muscular imbalance of the eye comprising a member having a sight opening, means for supporting a prism non-rotatable in its mounting and out of line of the sight opening, rotatable means for moving the fixedly mounted prism into line with the sight opening, means for supporting a pair of rotary prisms out of line with the sight opening, pivotal means for moving the pair of rotary prisms into line with the sight opening, and means for rotating the rotary prisms to compensate the displacement of the fixedly mounted prism.

10. In an eye testing instrument, means for testing the imbalance of the eye comprising a member having a sight opening, a support having a prism fixedly mounted therein with the widest part of the prism in a definitely fixed position, and out of line of the sight opening, means for moving the fixedly mounted prism into line with the sight opening, means for supporting a pair of rotary prisms out of line of the sight opening, means for moving the pair of rotary prisms into line with the sight opening, and means for rotating the rotary prisms to compensate the displacement of the fixed prism.

11. In an eye testing instrument, means for testing the imbalance of the eye comprising a member having a sight opening, a rotatable support having two prisms fixedly mounted therein, one with the widest part of the prism upwardly arranged and the other with the widest part of the prism outwardly arranged when aligned with the sight opening but both being normally out of line of the sight opening, means for moving the fixedly mounted prisms selectively into line with the sight opening, means for supporting a pair of rotary prisms out of line of the sight opening, means for moving the pair of rotary prisms into line with the sight opening, and means for rotating the rotary prisms to compensate the displacement of the fixedly mounted prism aligned with the sight opening.

12. In an eye testing instrument, means for testing the imbalance of the eye comprising a member having a sight opening, a rotatable support having two prisms fixedly mounted therein, one with the widest part of the prism upwardly arranged and one with the widest part of the prism outwardly arranged when aligned with the sight opening but both prisms being normally out of line with the sight opening and said prisms being of different power, means for moving the rotatable support to bring the desired fixedly mounted prism into line with the sight opening, means for supporting a pair of rotary prisms out of line with the sight opening, means for moving the pair of rotary prisms into line with the sight opening, and means for rotating the rotary prisms to compensate the displacement of the fixedly mounted prism aligned with the sight opening.

13. In an eye testing instrument, means for testing with color comprising a member having a sight opening, means for supporting a colored lens out of line with the sight opening, means to align the colored lens with the sight opening, means for supporting a white glass Maddox rod lens out of line with the sight opening, and means to move the white glass Maddox rod lens into line with the sight opening.

14. In an eye testing instrument, means for testing with color comprising a member having a sight opening, means to support a red colored lens out of line with the sight opening, means to align the red colored lens with the sight opening, means to support a white glass Maddox rod lens out of line with the sight opening, and means to move the white glass Maddox rod lens into line with the sight opening.

15. In an eye testing instrument, means for testing with color comprising a member having a sight opening, means for supporting a colored lens out of line with the sight opening, rotatable means to align the colored lens with the sight opening, means for supporting a white glass Maddox lens out of line with the sight opening, and pivotal means to align the white glass Maddox rod lens with the sight opening.

16. In an instrument for testing eyes, means for testing with color comprising a member having a sight opening, means for supporting a red colored lens out of line with the sight opening, rotatable means to align the red colored lens with the sight opening, means for supporting a white glass Maddox lens out of line with the sight opening, and pivotal means to move the white glass Maddox rod lens into alignment with the sight opening.

17. In an eye testing instrument, means for testing with color comprising a member having a sight opening, a support, a rotatable wheel on the support, a colored lens on the rotatable wheel mounted to be aligned thereby with the sight opening, a second support, a bracket pivoted on the second support and a white Maddox rod lens mounted on the bracket on which it may be pivotally swung into line with the sight opening.

18. In an eye testing instrument, means for testing with color comprising a member having a sight opening, a support, a rotatable wheel on the support, a red colored lens on the rotatable wheel mounted to be aligned thereby with the sight opening, a second support, a bracket pivoted on the second support and a white Maddox rod lens mounted on the bracket on which it may be pivotally swung into line with the sight opening.

HENRY L. DE ZENG.